United States Patent
McCord

[19]

[11] 3,905,031
[45] Sept. 9, 1975

[54] DATA PROCESSOR FOR A DOPPLER RADAR MAPPING SYSTEM USING A SYNTHESIZED ANTENNA ARRAY

[75] Inventor: Henry L. McCord, Los Angeles, Calif.

[73] Assignee: Hughes Aircraft Company, Culver City, Calif.

[22] Filed: June 8, 1964

[21] Appl. No.: 374,236

[52] U.S. Cl. ........ 343/5 CM; 343/5 MM; 343/5 PC; 343/9
[51] Int. Cl.$^2$..... G01S 7/06; G01S 9/02; G01S 9/44
[58] Field of Search ............. 343/100.7, 5, 7.7, 8, 9, 343/5 MM, 5 PC, 5 CM, 100 CL

[56] References Cited
UNITED STATES PATENTS
3,740,747  6/1973  Hance et al...................... 343/5 MM

*Primary Examiner*—Maynard R. Wilbur
*Assistant Examiner*—G. E. Montone
*Attorney, Agent, or Firm*—W. H. MacAllister; Walter J. Adam

EXEMPLARY CLAIM

12. A focused mapping system operable to map a range interval from a craft moving in azimuth relative to objects being mapped comprising, in combination, coherent radar means for developing a plurality of frequency varying Doppler signals having frequency and time characteristics representative of the position of the moving craft; means for recording said Doppler signals received over said range interval in the form of parallel line traces along the range dimension, the information from each range forming separable range elements; reading means coupled to said recording means for sequentially scanning successive range elements to develop Doppler history signals; control means coupled to said reading means for developing a first sweep signal having a duration so said reading means scans a portion of said traces in a direction substantially orthogonal thereto to form a range element and for developing a second sweep signal so said reading means sequentially scans successive range element for developing informational signals having frequency components proportional to the recorded Doppler signals; mixing means coupled to said reading means; swept oscillator means coupled to said mixing means; variable gain means coupled to said swept oscillator means and to said control means, said variable gain means being responsive to said first and second sweep signals to develop a reference function having a predetermined rate of change of frequency during each of said first sweep signals, said predetermined rate during any one of said first sweep signals being different from the preceding and succeeding sweep signals to provide all range focusing, said mixing means developing a difference frequency representative of the azimuth position of said objects; filter means including a plurality of narrow-band filters coupled to said mixing means for passing predetermined spaced apart frequency bands of said difference frequencies; detector means coupled to each of said narrow-band filters for developing display signals in response to components of said difference frequency falling within said spaced apart frequency bands being passed through said filter means; output means including a cathode ray tube, means for deflecting the electron beam thereof in synchronism with said reading means, and means for intensity modulating said electron beam; and switching means coupled between said output means and said detector means for commutating display signals to the intensity modulating means of said output means to develop a two-dimensional indication of the objects within said area being mapped.

13 Claims, 10 Drawing Figures

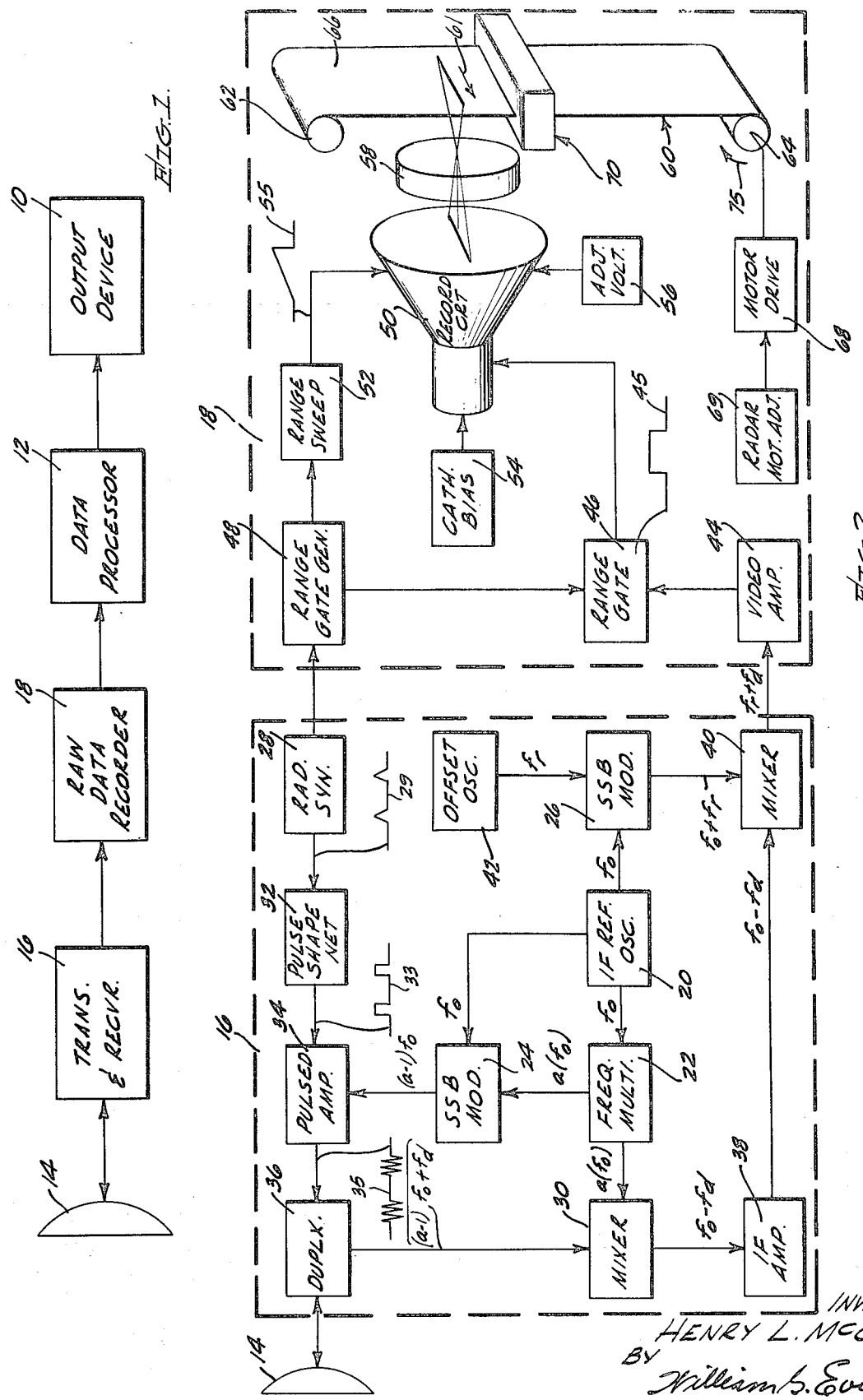

INVENTOR
HENRY L. McCORD,
BY William B. Everett
AGENT.

DATA PROCESSOR FOR A DOPPLER RADAR MAPPING SYSTEM USING A SYNTHESIZED ANTENNA ARRAY

This invention relates to radar mapping systems and particularly to a multibeam synthesized antenna array mapping system that provides a high resolution picture in range and azimuth of the region illuminated by the real antenna.

In a copending application entitled, "High Resolution Mapping System," Ser. No. 78,768, now U.S. Pat. No. 3,725,915, filed Dec. 27, 1960, by E. E. Herman and H. L. McCord, a synthetic array radar of a type similar to the present invention is disclosed. The term "synthetic array" means that a small radar antenna is moved perpendicular to the line of sight over some time interval, and the information is sampled (data processed) during that time such that the small antenna has a synthetic length (array) equivalent to the distance covered during that sampled time interval. Thus a small physical size antenna is synthetically made to appear as a physically large antenna array. There, as here, Doppler signals from a coherent side-looking radar carried by a moving craft are stored on a two-dimensional medium in the form of range traces. A portion of these range traces is then scanned along successive range elements by an electron beam to develop Doppler history signals. These in turn are cross-correlated electronically with a predetermined reference signal to discriminate against unwanted signal and noise components at all ranges.

In Herman et al., the presence of targets within a very narrow portion of the region illuminated by the real antenna beam will cause frequency components falling within a preselected frequency band to be generated. These are detected and ultimately fed to a strip map recorder. In other words, associated with the synthetic array is a very narrow pencil beam falling within the beam pattern of the real antenna.

In the present invention, a multibeam synthetic array having a common phase center is provided. As such, the radar returns from virtually all of the targets illuminated by the real antenna beam will, when processed, generate frequency components falling within one of the preselected spaced apart frequency pass-bands and subsequently will be detected. By sampling these in some sequence and feeding them, for example, to a display cathode ray tube whose electron beam is deflected in a corresponding manner, a two-dimensional display in real time is obtained.

It is therefore an object of the present invention to provide an improved high resolution mapping system.

It is another object of the invention to provide a synthetic array data processor capable of developing a plurality of narrow beams each lying within the region illuminated by the real antenna.

Another object of the invention is to provide a multibeam synthetic array each beam of which provides a high angular resolution output successively at each resolvable range.

Still another object is to provide an improved mapping system which develops for the viewer a simultaneous high resolution picture in range and azimuth of the region illuminated by the real antenna.

It is a further object of the invention to provide a multibeam synthetic array data processor having the unique capability of developing a twodimensional display of the area to be mapped with substantially no time delay.

In accordance with these and other features and objects of the invention, there is provided a mapping system comprising, in combination, coherent radar means for developing Doppler signals representative of the position of objects to be mapped, recording means coupled to the radar means for storing the Doppler signals, reading means coupled to the recording means to develop information signals, reference means including an oscillator for producing a frequency varying signal, mixer means coupled to the reading means and to the reference means for developing a difference frequency signal from the information and the frequency varying signals, filter means including a plurality of narrow-band filters coupled to the mixer means to pass the difference frequency signal at selected frequencies, detector means coupled to each of the narrow-band filters for developing a display signal in response to the passage therethrough of the selected frequencies of the difference frequencies signal, commutator means coupled to the outputs of the detector means and including means operatively responsive to the reading means to sample the outputs in a predetermined order, and map forming means coupled to the commutator means for receiving in this order the display signals to develop an indication of the object to be mapped.

In yet another aspect of the invention, there is provided a multibeam synthetic array data processor for use in a radar mapping system of the type operable from a moving craft to form a high resolution display of an area to be mapped and including radar means for developing Doppler signals from objects present within this area and recording means for storing these Doppler shift signals. The multibeam synthetic array data processor for such a mapping system comprises, in combination, readout means coupled to the recording means for scanning the stored Doppler signals to develop Doppler history signals, mixer means coupled to the readout means and including an oscillator for generating a reference signal of varying frequency, the mixer means being responsive to the Doppler history signals and to the reference signal to develop difference frequency signals; filter means including a plurality of narrow-band filters each coupled in parallel circuit relationship to the mixer means and each having spaced apart pass-bands; detector means coupled to each of the narrow-band filters for developing mapping signals in response to the transmission therethrough of frequency components of the difference frequency signals falling within the pass-bands; commutating means including an output terminal coupled to the detector means for providing a conductive path between it and the output terminal; and display means coupled to the output terminal and including a cathode ray tube, means for deflecting the electron beam thereof in synchronism with the readout means and means for modulating the electron beam with the mapping signals to develop a two-dimensional indication of the objects within the area to be mapped.

Briefly, as the radar moves by a point reflector, at essentially constant range, the Doppler shift caused by this motion is substantially a linear decrease in frequency. Successive radar pulses, when recorded on, for example, the film storage device disclosed in the Herman et al. application, appear with amplitudes varying according to this changing Doppler frequency. After the film is developed, it is scanned along the azimuth dimension for each range element by a readout electron beam in a manner similar to that of a conventional TV kinescope. The modulated light, representing the Doppler history on a range element basis and penetrating the film, is converted to an electrical signal by a photomultiplier tube. A swept oscillator, programmed in such a way that its output frequency varies at the same rate as the point target Doppler frequency but at an average frequency somewhat higher than that of the point target, provides the desired frequency offset when its output is heterodyned in a mixer with the photomultiplier tube output. The mixer output is then applied to a bank of narrow-band filters, detected and then box-carred for ultimate transmission to an output display device.

Thus, as the target frequency history moves by the image of the cathode ray tube raster, different portions of the total history will be examined by the readout cathode ray/photomultiplier tube combination. In other words, as the film moves the target history to different positions, the readout cathode ray tube raster yields different portions of this target history to the mixer for comparison with the swept oscillator output. For example, at some arbitrarily chosen incident in time, the mixer output may have components of frequency which, for reasons set forth above, would excite a particular narrow-band filter. An instant later at, say — a successive film position — the mixer output may now contain slightly different frequency components for the same reason, except this time a different narrow-band filter would be excited. Thus, as the film moves, successive narrow-band filters are excited. Moreover, if the recorded radar signal at some range contained target returns from various points each angularly spaced relative to the flight path direction, then the recording of the composite signal over successive range pulses would yield the sum of different frequency histories. Here then, as the readout signal is heterodyned in the mixer with the output of the swept oscillator, the corresponding narrow-band filters would respond in accordance with the frequency components contained in the mixer output so that a simultaneous high resolution response is obtained.

An alternate implementation of the invention would be one utilizing a single narrow-band filter and a plurality of swept oscillators each generating a linearly varying frequency of different slope. In any event, the narrow-band filter outputs are detected and fed in sequence to either a modified strip map recorder of the Herman et al. type or to a two-dimensional real time cathode ray display as described hereinbelow.

The above and other features, objects and advantages of the present invention will appear from the following description of an exemplary embodiment thereof illustrated in the accompanying drawings wherein like characters refer to like parts and wherein:

FIG. 1 shows a functional block diagram of a synthetic array mapping system of the present invention;

FIGS. 2 and 3 comprise detailed block diagrams of the synthetic array mapping system of FIG. 1;

Figure 8:
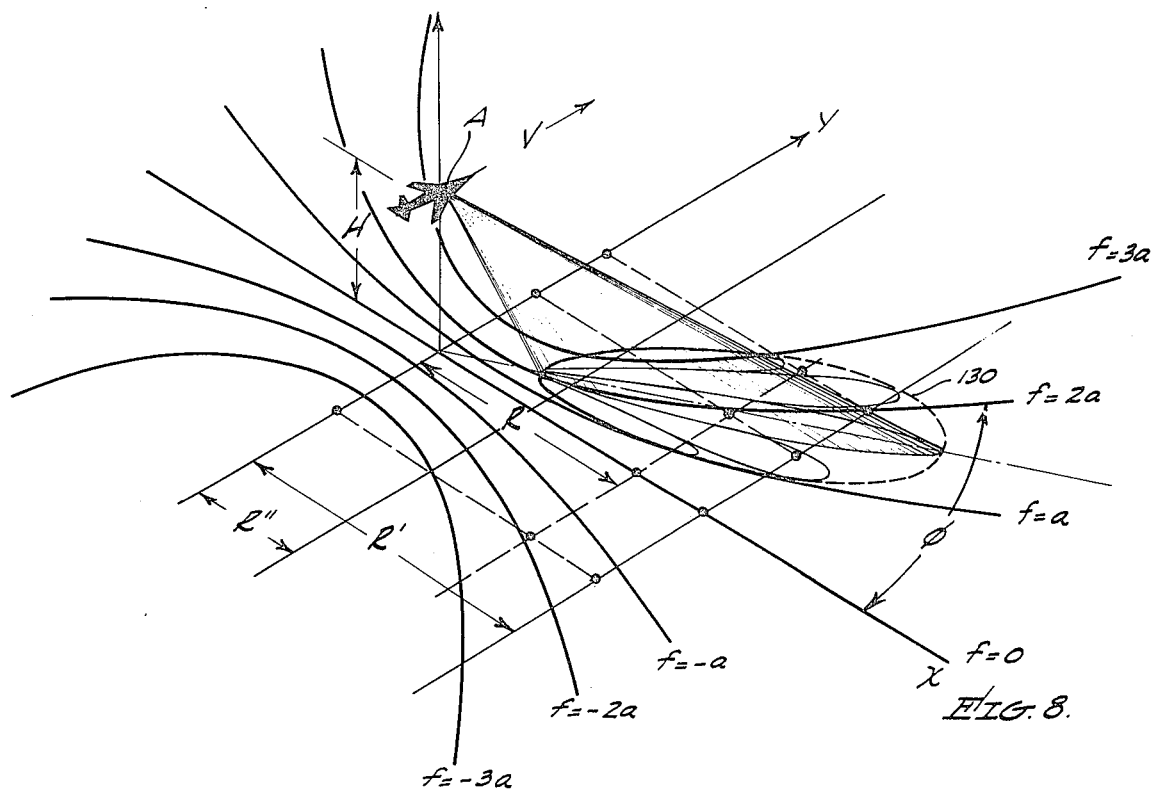
Figure 7:
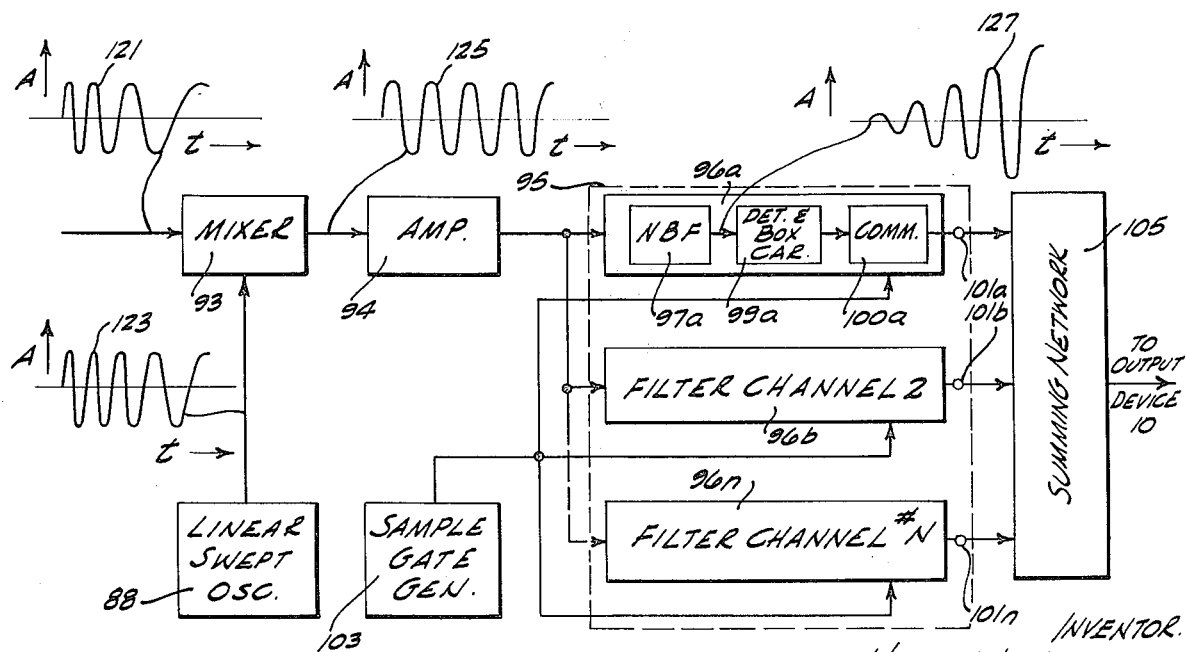
Figure 9:
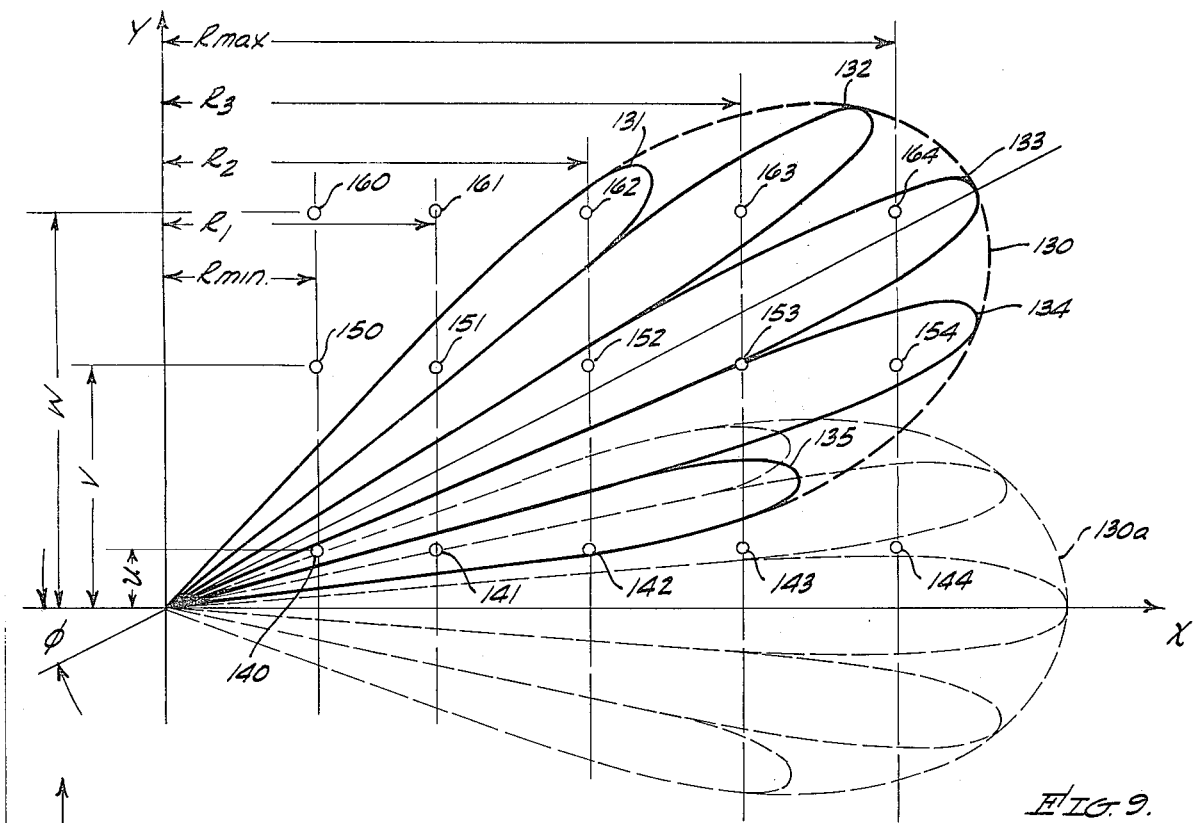
Figure 10:
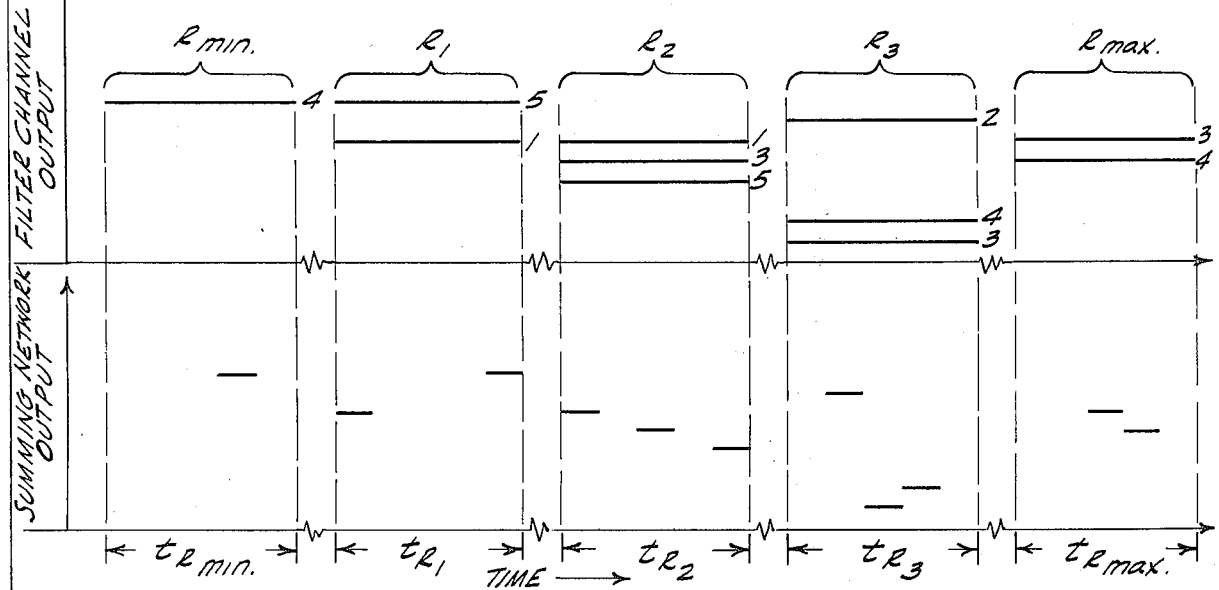

FIG. 7 comprises a simplified block diagram of a portion of the system of FIG. 1;

FIG. 8 shows in perspective an area illuminated by a vehicle-borne multibeam mapping system of the present invention, the average beam pointing direction being forwardly of an off-broadside position. A family of curves representing Doppler shift frequencies projected on the X-Y plane is included and serves to facilitate describing the invention;

FIG. 9 shows an enlarged partial plan view of the illuminated area illustrated in FIG. 8; and FIG. 10 is a graph used in conjunction with FIGS. 8 and 9 to describe the invention.

FIG. 1 shows a functional block diagram of a radar mapping system of the present invention comprising an output device 10 and a multibeam synthetic array data processor 12 for processing radar returns from targets illuminated by a sidelooking antenna 14 with coherent pulses developed by a transmitter-receiver 16 and recorded on a storage medium included in a raw data recorder 18.

FIG. 2 shows a detailed block diagram of the transmitter-receiver 16 and the data recorder 18 of FIG. 1. The transmitter-receiver 16 includes a reference oscillator 20 for generating an IF signal, $f_o$, which is fed to a frequency multiplier 22 and to single side-band modulators 24 and 26. The output of the multiplier 22, $a(f_o)$, in turn is coupled to a mixer 30 and to the modulator 24. An RF signal, $(a-1)f_o$, is thus available at the output of the modulator 24.

A radar synchronizer 28 is also provided in the transmitter-receiver 16 for developing timing pulses having a waveform 29. A pulse shaping network 32 squares the waveform 29, and this squared wave 33 is used to gate a pulsed amplifier 34 to which the RF signal, $(a-1)f_o$, is coupled. The output of the pulsed amplifier 34 is a pulsed RF carrier, shown in FIG. 2 as waveform 35. This pulsed carrier is coupled to the antenna 14 through a duplexer 36 and radiated in a known direction into space.

Radar returns from those targets illuminated by the directional antenna 14 are fed through the duplexer 36 to the mixer 30 and include the RF carrier, $(a-1)f_o$, and a Doppler shift frequency, $f_d$. At the mixer 30, the output of the multiplier 22, $a(f_o)$, is heterodyned with the radar returns, $(a-1)f_o + f_d$, resulting in a signal containing the IF signal and the Doppler shift frequency, namely, $f_o - f_d$. The output of the mixer 30, $f_o - f_d$, may by amplified first, as in amplifier 38, before being applied to a mixer 40.

The mixer 40 also receives another composite signal comprising the IF signal, $f_o$, and a reference offset frequency, $f_r$. The former $f_o$ portion is supplied by the reference oscillator 20 and the latter $f_r$ portion by an offset oscillator 42, both portions being combined by the modulator 26. The bipolar video output signal of the mixer 40, $f_r + f_d$, and the timing pulses from the synchronizer 28 comprise the outputs of the transmitter-receiver 16 that are coupled to the data recorder 18, reference FIGS. 1 and 2.

A video amplifier 44 is provided in the data recorder 18 of FIG. 2 to amplify the bipolar video signal received from the mixer 40. This amplified video signal is applied through a range gate 46 to the beam intensity grid of a line scan record cathode ray tube 50. A range gate generator 48 receives the waveform 29 from the radar synchronizer 28 and in response thereto actuates the range gate 46 during a finite time interval within each interpulse period, reference waveform 45. Only video signals applied to the range gate 46 during the time interval represented by the waveform 45 are transmitted to the intensity grid of the record cathode ray tube 50. Conversely, video signals from targets other than those within the ranges which this time interval represents are rejected by the range gate 46.

A range sweep generator 52 is also provided for deflecting the electron beam of the record cathode ray tube 50 at the proper time and rate, as for example by a ramp input 55, when appropriately triggered by the range gate generator 48. For an off-broadside beam pointing direction of the antenna 14, for example, the line scan parallels the arrow 61. Voltage sources 54 and 56 are also provided for respectively controlling both the intensity and the position of the electron beam of the record scanning tube 50.

The data recorder 18 also includes a film transport mechanism 60 comprising spaced apart film carrying cylinders 62 and 64. A motor drive 68 is coupled to the cylinder 64 to transport a strip of film 66 passed the record cathode ray tube 50 so that the bipolar radar video may be light imaged onto the light sensitive film 66 through a lens system 58. A motor controller or radar motion adjust device 69 may be provided to control the speed of the film 66 as desired. A film processing unit 70 is also provided to develop the film 66 directly after its exposure. A more detailed description of the data recorder 18 is presented in the above-mentioned copending application filed by Herman et al.

Figure 3:
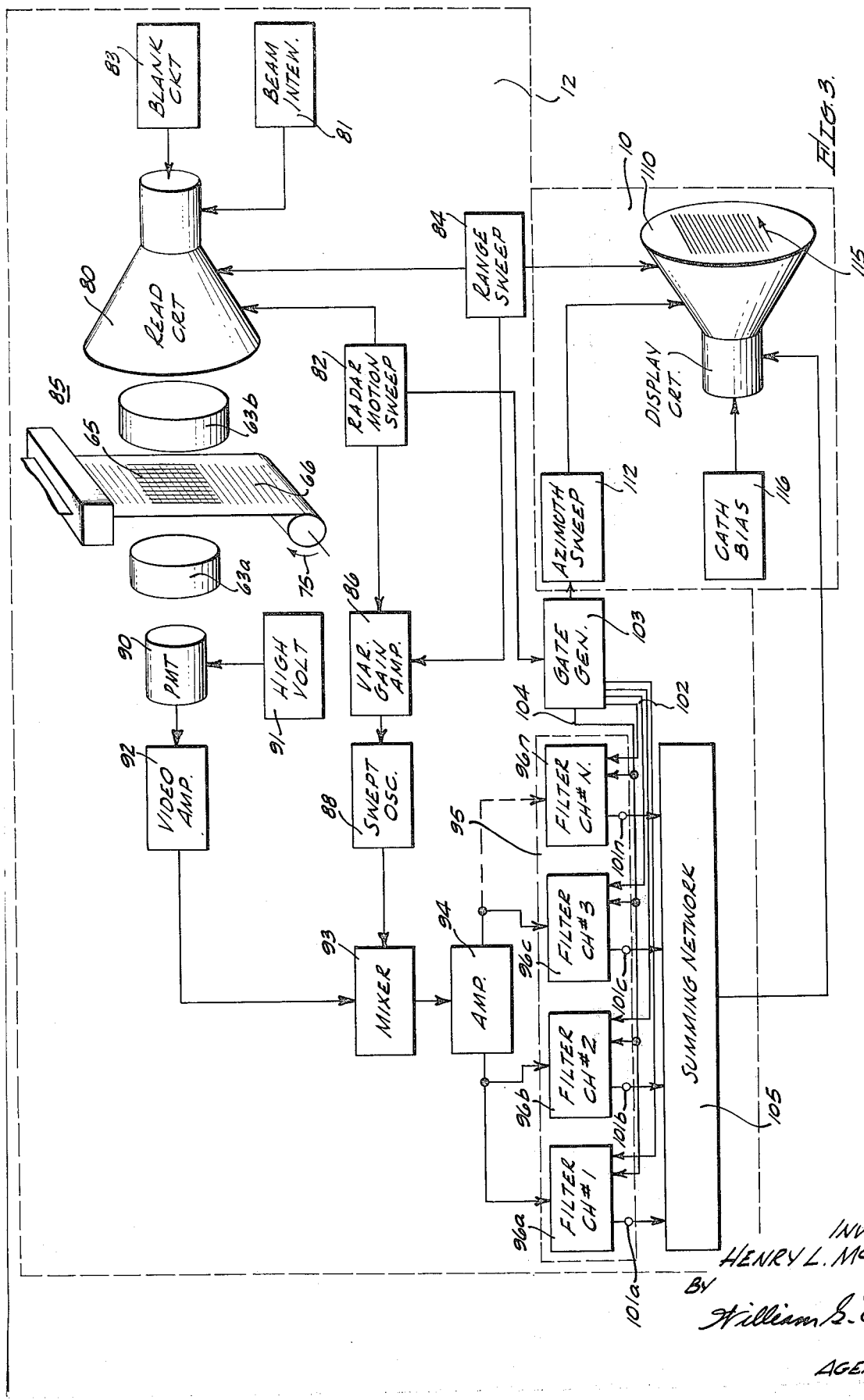

The data processor 12 in FIG. 3 includes a flying spot scan-converter 85 comprising a read scanning cathode ray tube 80 mounted adjacent to and facing one side of the film 66 and a photomultiplier tube 90 mounted on the other side of the film 66 preferably in axial alignment with the read cathode ray tube 80. Conventional lenses 63a and 63b are provided for focusing purposes.

The electron beam of the read cathode ray tube 80 is deflected in a longitudinal direction along the film strip 66 by a radar motion sweep generator 82 and in a transverse direction across to the film strip 66 by a range sweep generator 84 in TV-like fashion, thus forming a reading frame or raster 65. Voltage sources 81 and 83 are also provided for controlling the beam intensity and the cathode bias, respectively, of the read cathode ray tube 80.

That energy, emanating from the scanning beam of the read cathode ray tube 80 and penetrating the film 66 in the form of intensity modulated light, which is received by the photomultiplier tube 90 is thereupon converted to an analogous voltage representative of the Doppler history, or information signal, stored on the film 66 over the scanning time interval for the particular range element scanned. This scanning process is repeated in sequence for each of the range elements forming the reading frame 65. Successive reading frames, formed as the film 66 is advanced in the direction of the arrow 75, are similarly scanned.

The Doppler history or information signal from the photomultiplier tube 90 is then fed to a video amplifier 92 and hence to a mixer 93 which receives also the frequency varying signal from a voltage controlled swept oscillator 88. A variable gain amplifier 86 supplies the control voltage for the swept oscillator 88, the outputs of the radar motion generator 82 and the range sweep generator 84 being used to drive the variable gain amplifier 86.

Since the slope of the Doppler shift frequency versus time is a function of range, the slope of the oscillator 88 output must be similarly varied if all-range focusing, and hence increased resolution, is to be realized. Thus, in FIG. 3, the output of the variable gain amplifier 86 is a linearly varying voltage of the proper slope for each range element which, when applied to the voltage controlled swept oscillator 88, will result in its developing a reference signal commencing initially with a first predetermined frequency and thereafter decreasing linearly to a second predetermined frequency, all within the time necessary to scan the instant range element.

By varying the frequency at the beginning and/or at the end of this scanning time interval accordingly, the slope of the reference signal may be adjusted as desired to that which, at any particular range, the slope of the Doppler shift as computed should be when the corresponding targets are illuminated by the antenna beam. To this end, the radar motion sweep generator 82 develops a ramp function which is modified accordingly by a signal from the range sweep generator 84 representing instantaneous range information. It is this ramp function and range information that the variable gain amplifier 86 receives and in response thereto develops the desired driving voltage for the voltage controlled swept oscillator 88. Its linearly varying frequency output constitutes the reference frequency function with which the Doppler history, or information signal, first stored on the film 66 and then read out by the cathode ray tube-photomultiplier combination, is cross-correlated.

It should be pointed out that the side-looking antenna 14 of FIGS. 1 and 2 may be squinted forwardly or rearwardly from the side-looking or broadside position. In such an event, the bipolar video signal from the mixer 40 may still be recorded on the film 66 as above described in the direction of the arrow 61. However, pointing the antenna 14 off-broadside as is shown in FIGS. 8 and 9 requires that the readout raster 65 and the variable gain amplifier be varied accordingly.

The output of the mixer 93 comprises a complex voltage including, among other components, the difference frequency between the Doppler history and the reference frequency function. All other frequency components are, for all practical purposes, rejected by a bank of filters 95, to be described. The sum rather than the difference frequency component may be used if desired provided certain changes which become apparent in view of the description to follow are first made.

The mixer output is amplified by an amplifier 94 before being supplied to the filter bank 95 which comprises filter channels 96a, 96b, 96c, ... 96n. Each channel 96, as seen in FIG. 4, includes a narrow band-pass filter 97 which serves as an AC integrator, a high level band-pass amplifier 98, a combination envelope and box-car detector 99 and an output time multiplexer or commutator 100.

The amplifier 98 raises the low level output of the filter 97 to a level suitable for linear envelope detection. The envelope detector, preferably of the doubler type and capacitively coupled to the amplifier 98, may include a bias control to cancel out DC offsets. A conventional 6-diode gate utilizing fast recovery, low leakage, high conductance silicon diodes may be used in the box-car portion of the detector 99 to provide a high forward-to-reverse transmission ratio. A cathode follower may also be provided to prevent excessive loading of the box-car detector storage capacitor.

The output time multiplexing of the filter bank 95 may, for example, be accomplished through the gating of common base transistor amplifiers. Thus, to sequentially sample the outputs of each filter channel, a trigger pulse from a sample gate generator 103, reference FIG. 3, is delivered to each of the commutators 100a, 100b, . . . 100n via the corresponding cables 102 at the proper time within the read scan time interval. This in turn triggers the associated common base amplifier into conduction and commutates the detected voltage stored, if any, in the box-car capacitors, not shown, to the input of a summing network 105 for amplification and subsequent transmission to the output device 10. As this sampling is taking place, the narrow-band filters 97, reference FIG. 4, are repeating the very integrating process that developed the voltages presently being sampled. Note, that prior to storing the filter output voltages, the box-car capacitors may be clamped to, for example, ground in a conventional manner; likewise, after such storage, the narrow-band filters 97 may be similarly clamped to assure that the energy level in each is substantially zero at the beginning of each range element readout. In FIG. 3, the gate generator 103 may supply via a cable 104 the clamping pulses for such purposes along with an enabling pulse for simultaneously transferring all of the filter output voltages to the box-car storage capacitors. The radar motion sweep generator 82 is also used to synchronize the gate generator 103 so that each of the filter channels 96 is sampled in sequence during the scanning of the next range element scanned by the read cathode ray tube 80.

Figure 4:
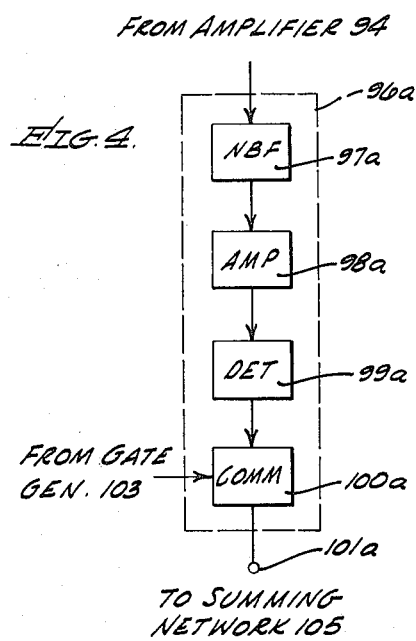
FIG. 4 is a detailed block diagram of a filter channel shown in FIG. 3.

Consider for a moment the filter channel 96a, reference FIGS. 3 and 4. Due to the movement of the film 66 in the direction of the arrow 75, each readout raster frame 65 is in time a fraction of an array interval later than the previous frame 65. Stated differently, each successive readout raster frame 65 is gradually shifted upwardly relative to the film, as seen in FIG. 3, thereby reading a later time interval of Doppler history on each range element or target. When the raster 65 has reached a position such that a target Doppler history becomes properly aligned, i.e., offset, with respect to the reference frequency function, then the heterodyned difference frequency between these two, now a constant frequency, will fall within the pass-band of the narrow-band filter 97a, reference FIG. 4. Thus, during the horizontal scan, the filter 97a will build up integrating to a maximum value when the difference frequency equals its center frequency. Other targets not at this moment so aligned in azimuth will develop a displaced difference frequency which the filter 97a will reject substantially if entirely outside its pass-band.

The actual frequency to which each integrating narrow-band filter 97 is tuned determines the angle with respect to the flight path at which the readout target Doppler history cross-correlates to a maximum with the swept oscillator output, i.e., the reference frequency function. In other words, the tuning of each of the filters 97 determines the exact azimuthal pointing direction of the corresponding synthetic array beams, all of which must lie within the real antenna illumination. FIGS. 8 and 9 illustrate this.

The output of each filter 97 is independently detected and, at the end of each horizontal readout, is simultaneously sampled in all channels 96 and stored in separate box-car storage capacitors. These stored or box-carred outputs of the filter bank 95 represent, in effect, the correlation amplitudes at one range element over a multiplicity of azimuthal pointing directions. These are then commutated to provide intensity modulation to, for example, a strip map recorder where unlike the one shown and described above in conjunction with FIG. 2 the recorder electron beam is stepped in small increments in the flight path dimension as each successive output is commutated onto the intensity grid. The strip map recorder disclosed in the above-mentioned Herman et al application is susceptible to such modification with no changes being necessary in the range dimension. Thus, as a target migrates through successive filter channels 96a to 96b, 96b to 96c, etc., in successive readout frames 65, the target is rerecorded in registration on the moving strip map, thereby accomplishing video integration.

As mentioned above, the tuning of a particular narrow band-pass filter 97 determines the array azimuthal pointing direction; hence, each successive filter in the bank 95 is tuned to a slightly different frequency so that together an entire azimuth sector, as desired, may be illuminated, processed and displayed with high resolution in real time on a two-dimensional display, such as a display cathode ray tube 110 shown in FIG. 3. For example, a bank of 40 narrow band-pass filters, each having a 3 db bandwidth of 4.5 kc and each spaced 15.5 kc apart, could be used to cover a 620 kc frequency band.

In FIG. 3, the detected outputs of the filter channels 96 are sequentially commutated to the intensity control grid of the display cathode ray tube 110. At the same time, its electron beam is deflected in azimuth, depicted by an arrow 115, to correspond to the exact tuning or equivalent azimuthal pointing direction of each filter. An azimuth sweep generator 112 is provided for this purpose and is synchronized to the sampling gate generator 103. In the range coordinate, the display electron beam is swept in synchronism with the range sweep generator 84. A source of energy 116 is also provided to control the cathode bias of the display cathode ray tube 110.

It should be pointed out that as many as 100 filter channels can be readily commutated within the time intervals available even though a complete commutation sequence is required for every range element in the readout raster.

Figure 5:
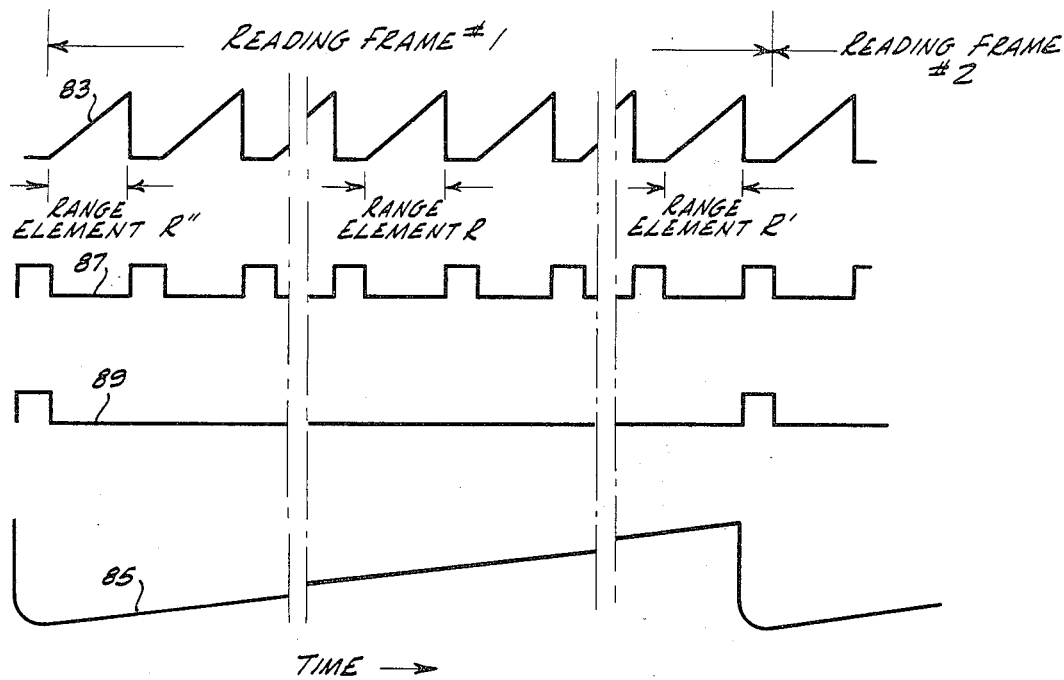
FIGS. 5 and 6 illustrate the time relationship of selected waveforms useful in describing the invention.

In FIG. 5, the relationship in time between the outputs of the radar motion sweep generator 82 and the range sweep generator 84 during each reading frame is illustrated by the waveforms 83 and 85, respectively. The waveforms 87 and 89 represent in a similar manner the azimuth and range blank pulses, respectively, that may be fed to the read cathode ray tube 80 to extinguish its electron beam during fly back.

It should be noted that the waveform 87 may also represent the enabling pulses supplied to the gate generator 103 which develops n-pulses in sequence which in turn are sent to the commutators 100, reference FIG. 4, to sample during readout the voltages box-carred, if any, during the preceding readout. Similarly, the output of the azimuth sweep generator 112 can be represented by the waveform 83; in that event, the waveform 87 may also represent the driving signal fed to the azimuth sweep generator 112 by the gate generator 103.

Figure 6:
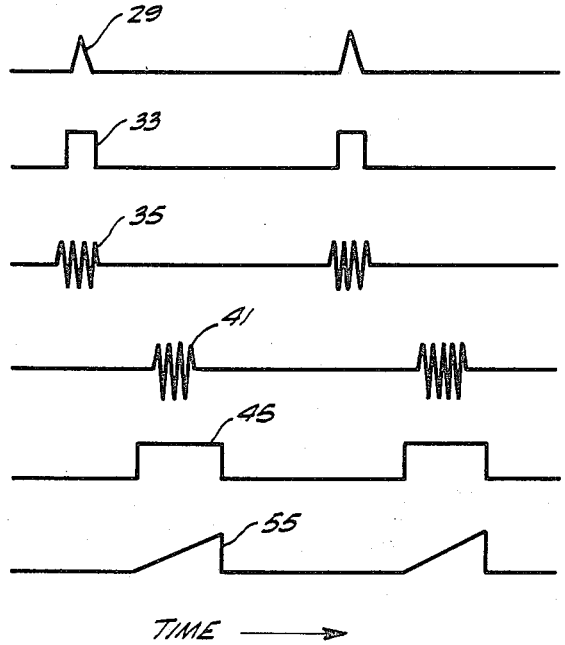

In FIG. 6 the time relationships between the timing pulses 29, its squared waveform counterpart 33, and the pulsed carrier waveform 35 are shown along with the range gated time interval represented by the waveform 45 and the ramp input function 55. The output of the IF amplifier 38, namely, $f_o - f_d$, is shown by a waveform 41.

To summarize briefly at this point, reference is made to FIG. 7 where the output of the read cathode ray tube-photomultiplier tube combination for a point target reflector may be as shown by a waveform 121. The waveform 121, substantially a linearly varying frequency with time t, is fed to the mixer 93 and heterodyned with a waveform 123 representing the substantially linear reference frequency function output of the swept oscillator 88. Assuming that the slope of the waveform 123 equals that of the waveform 121, then in that event, the output of the mixer 93 is a waveform 125 of constant frequency. This may be amplified first before being fed to each channel of the filter bank 95. The narrow-band filter of each channel, being tuned to different center frequencies, therefore acts as one of a number of contiguous synthetic array beams.

Consider now the case where the frequency of the waveform 125 in FIG. 7 equals precisely the center frequency of the filter channel 96a. This in fact occurs when the point target reflector mentioned in the preceding paragraph passes, due to the relative motion involved, through the center of the particular synthetic beam in effect generated by the filter channel 96a by virtue of the tuning of its narrow band-pass filter 97a and of necessity falling within the real antenna pattern shown in FIGS. 8 and 9.

Thus, with the center frequency equaling that of the waveform 125, the narrow-band filter 97a will build up acting like an AC integrator during the readout scanning time interval to a voltage depicted by a waveform 127. The waveform 127 is envelope detected and stored at the end of this time interval in the storage capacitors of the envelope and box-car detector 99a. During the next readout scanning time interval, the sample gate generator 103 delivers in some sequence the above-mentioned enabling pulse to each of the commutators 100 thus actuating the commutator 100a and the others at the proper time according to the sequence. The stored voltage, if any, is thus made available at the corresponding output terminals 101 of the filter channels 96 at the right time for amplification in the summing network 105 and subsequent application to the output device 10 of FIG. 1.

The output from the summing network 105 may be applied to the intensity grid of either the display cathode ray tube 110 of FIG. 3 or a record cathode ray tube, such as the record cathode ray tube 50 of FIG. 2. In either event, the deflection in the azimuth direction of the respective electron beam is synchronized with that of the read cathode ray tube 80 of FIG. 3, thus providing video integration and correct film registration.

In FIG. 8 an aerospace vehicle A carrying a multibeam synthetic array side-looking radar of the type described above, is shown moving at a speed V in the Y direction at an altitude H above the X–Y plane. The beam pointing direction of the radar antenna is shown, for illustrative purposes only, at an angle $\phi$ from the broadside of the vehicle A. A dotted line 130 represents the surface region illuminated by the real antenna beam at some arbitrary instant in time. Shown also is a family of curves in the X–Y plane ranging from $F = 3a$ decreasing through $F = 0$ to $F = -3a$. These curves represent the relationship between the Doppler shift frequency developed due to the motion of such a vehicle relative to the position of an illuminated point target reflector in the X–Y plane. For example, at any point along the curve $F = a$, an illuminated target will reflect a portion of the energy transmitted at a frequency increased by an amount equal to $a$. For targets positioned along the curve $F = 2a$ this change in frequency will be increased to an amount equal to $2a$. Similar statements are applicable to all of the Doppler shift curves.

In FIGS. 8 and 9 five contiguous synthetic array beams 131, 132, 133, 134, and 135 are shown within the region 130 illuminated by the real antenna mounted on the vehicle A. This means then that the filter bank 95, contained in the radar carried by the vehicle A, comprises 5 filter channels, the narrow-band filter of each being tuned to a slightly different center frequency. The choice of five here is not significant; more or less than five may be used. Moreover, the statements to follow are equally applicable whether the antenna is squinted forwardly from its broadside position at an angle $\phi$ or is pointed along the X-axis as shown in FIG. 9 by a dashed line 130a. In either event, the relative positions of the synthetic array beams 131–135 remain unchanged.

Shown also for illustrative purposes in the X–Y plane of FIG. 9 are fifteen point target reflectors 140–144, 150–154, and 160–164 inclusive. The target reflectors 140–144 are arbitrarily positioned in azimuth a distance "U" units from the X-axis at separate ranges, namely $R_{min}$, $R_1$, $R_2$, $R_3$, and $R_{max}$ from the Y-axis. The target reflectors 150–154 and 160–164 are similarly positioned in range but at azimuth distances of "V" and "W" units, respectively, from the X-axis. This arrangement, taken in conjunction with FIG. 10, facilitates a simplified operative description of the invention.

In FIG. 10, it will be noted, the abscissa represents time, and this time axis is divided into five equal time intervals, namely $t_{R_{min}}$, $t_{R_1}$, $t_{R_2}$, $t_{R_3}$, and $t_{R_{max}}$. Each of these represents the time necessary for the read cathode ray tube electron beam to scan a typical range element of the reading frame 65 of FIG. 3. Each of the foregoing time intervals is further separated from the other by a determinable time, an amount equal to that necessary to readout the Doppler history of each of the range elements intermediate the ranges $R_{min}$, $R_1$, $R_2$, $R_3$, and $R_{max}$.

Consider now the targets 140, 150, and 160 which are spaced in azimuth $R_{min}$ units from the Y-axis. At that instant shown in FIG. 9, the target 140 is positioned at the center of the beam 134. The targets 150 and 160, however, are outside the illuminated region 130. Thus, only the target 140 reflects energy recently transmitted; this is recorded and read out and the Doppler history output thereby obtained mixed with the swept oscillator output. Of the five filters, only one — the one that in essence generates the beam 134 through which the target 140 is passing — namely, the fourth narrow-band filter in response to the resultant mixed signal builds up. This build up in voltage is envelope detected, stored and sequentially sampled, and in FIG. 10 appears during the time interval $t_{R_{min}}$ as indicated by a line followed by a numeral "4." The numeral "4" represents the filter channel number 4.

During the next time interval $t_{R_1}$ shown in FIG. 10, the first and the fifth filter, for the same reason that caused the aforementioned filter channel number 4 to respond, now build up because, as seen in FIG. 9, the targets 151 and 141, respectively, are passing through the corresponding beams 131 and 135. Note, the output of the first filter channel, reference FIG. 10, is less than that of the 5th filter channel since, as seen in FIG. 9 the target 151 has already passed through the center of the beam 131 while the target 141 is still approaching the center of the beam 135. This is understandable since the cross-correlation signal is maximal when a point target reflector is positioned along the centerline of the corresponding synthetic array beam.

At a later time interval during the readout, namely $t_{R_2}$, the relative position of the targets 162, 152, and 142 within the illuminated region 130 in essence excites the first, third, and fifth filters in the filter bank. However, in FIG. 10 the outputs of the respective filter channels vary in amplitude since the relative position of these targets within the corresponding synthetic beams are not the same.

Likewise, during a subsequent scanning time interval, namely $t_{R_3}$, the targets 163 and 153 for similar reasons bring about the build up of the second, third, and fourth filter channels. Here again, FIG. 10 shows in a relative manner the extent of this filter build up and hence filter channel output. Since the target 153 is located along the boundary of adjacent synthetic array beams 133 and 134, both filter channels associated with these beams respond but to a substantially lesser extent. The target 143, it is seen, is outside the region 130 and hence is no longer illuminated by the real antenna.

At maximum range from the flight path, the targets 164 and 154 fall within the synthetic array beams 133 and 134 respectively. As a result, the third and fourth filters are excited and the correlated output is accordingly shown in FIG. 10 by the lines marked 3 and 4 during the time interval $t_{R_{max}}$.

It should be understood that as successive reading frames are scanned the relative position of each of these targets shown in FIG. 9 changes slowly depending upon the relative motion of the vehicle A of FIG. 8. It follows in turn that the relative outputs of each of the five filter channels as shown in FIG. 10 also change. As each target shown in FIG. 9 progresses through each synthetic array beam, the output of the corresponding filter increases and then decreases in a cyclic manner.

As mentioned in conjunction with FIGS. 3, 4, and 7, the outputs of the filter channels are sampled in sequence and then fed to the output device 10. FIG. 10 graphically illustrates this. But first note that each of the time intervals is further divided into a like number of subintervals as there are filter channels to be sampled. Five subintervals therefore are shown. Consider now the time interval $t_{R_{min}}$ during which only the fourth filter builds up since only a single target reflector, namely the target 140, is not only illuminated by the real antenna but also is positioned within the synthetic array beam 134. During the scanning of this, the range element $R_{min}$, none of the other filter channels is excited because the output of the mixer 93 contains only frequencies falling within the passband centered about the center frequency to which the fourth filter is tuned. Thus, the electron beam of, say, the display cathode ray tube 110 of FIG. 3 is intensity modulated only during the fourth of the 5 subintervals comprising the time interval $R_{min}$. The relative intensity of the electron beam is indicated by the ordinate position in FIG. 10.

During the time interval $t_{R_1}$ the electron beam is intensity modulated during the first and fifth subtime intervals, the extent of this modulation being greater during the latter relative to the former. It follows then that during the interval $t_{R_2}$ the intensity modulation progressively decreases relatively sightly during the first, third, and fifth subtime intervals. The electron beam is blanked during the second and fourth subtime interval.

Likewise, during the time interval $t_{R_3}$ the intensity modulation of the display electron beam is near maximum during the second subtime interval, is virtually nonexistent during the third subtime interval, and is only slightly greater than that during the fourth subtime interval. At the maximum range $R_{max}$, the electron beam is deflected the maximum amount in the range dimension and blanked during the first, second, and fifth subtime intervals.

It should be pointed out that during the next and subsequent reading frames, the filter channel outputs as shown in FIG. 10 will vary accordingly to the relative position of the target reflectors passing through the corresponding synthetic array beams. This means that the time multiplexing output of the summing network is also changing in a corresponding manner. stated differently, as the target 140 changes position in time, passing out of the synthetic beam 134 and into the beam 135, the voltage build up in the fourth filter becomes less and less for each frame until ultimately no build up occurs while in the fifth filter, the cycle is just commencing, i.e., the voltage build up is becoming stronger and stronger with each passing frame. This means that the output of the summing network, in response to the presence of the target 140, subsequently shifts from the fourth subtime interval to the fifth subtime interval as the strip map, if used in the output device 10, advances in time at an analogous rate so as to provide proper film registration. Similar statements can be made with regard to each and all of the targets shown in FIG. 9 as well to targets not shown but nonetheless present.

Thus, there has been described a synthetic array radar that includes a data processor which records the target returns from a moving coherent side-looking pulsed radar; reads out these returns at successive ranges over distances equivalent to large radar motions; compares these readout signals at successive ranges with a reference function to form simultaneously a multibeam synthetic array, each beam of which provides a high angular resolution output, successively at each resolvable range, which is separate from all the other beams; and in conjunction with an appropriate display, provides the viewer with a simultaneous high resolution picture in range and azimuth of the region illuminated by the real antenna rather than with a time delay required for a strip-map to build up as is necessary when conventional single-beam synthetic array data processors are used.

What is claimed is:

1. A mapping system comprising, in combination, coherent radar means for developing Doppler signals representative of the position of objects to be mapped; recording means coupled to said radar means for storing said Doppler signals; reading means coupled to said recording means to develop information signals; reference means including an oscillator for producing a frequency varying signal; mixer means coupled to said reading means and to said reference means for developing a difference frequency signal from said information and said frequency varying signals; filter means including a plurality of narrow-band filters coupled to said mixer means to pass said difference frequency signal at selected frequencies; detector means coupled to each of said narrow-band filters for developing a display signal in response to the passage therethrough of said selected frequencies of said difference frequency signal; commutator means coupled to the outputs of said detector means and including means operatively responsive to said reading means to sample said outputs in a predetermined order; and map forming means coupled to said commutator means for receiving in said order said display signals to develop an indication of the object to be mapped.

2. A radar mapping system comprising, in combination, coherent radar means for developing Doppler signals representative of the positions of objects to be mapped; recording means coupled to said radar means for storing said Doppler signals; readout means coupled to said recording means for scanning the stored Doppler signals to develop information signals; reference means including an oscillator for producing a frequency varying signal; mixer means coupled to said readout means and to said reference means for developing a difference frequency signal from said information and said frequency varying signals; filter means including a plurality of narrow-band filters coupled in parallel circuit relationship to said mixer means, each filter being adapted to pass a predetermined portion of said difference frequency signals at preselected spaced apart center frequencies; detector means coupled to each of said narrow-band filters for developing display signals in response to the passage of said predetermined portions, said display signals being indicative of the position of the objects to be mapped; commutator means coupled to said signal forming means and including driving means for sequentially connecting said commutator means to said detector means to provide a conductive path for said display signals; and display means including a cathode ray tube coupled to said commutator means and to said readout means for developing an indication of the objects to be mapped.

3. A radar mapping system comprising, in combination, coherent radar means for developing Doppler signals representative of positions of an object to be mapped; recording means coupled to said radar means for storing said Doppler signals; readout means coupled to said recording means for scanning the stored Doppler signals to develop information signals; reference means including an oscillator for producing a frequency varying signal; mixer means coupled to said readout means and to said reference means for developing a difference frequency signal from said information and said frequency varying signals; filter means including a plurality of narrow-band filters coupled to said mixer means for receiving said difference frequency signal; detector means each coupled to one of said filters; switching means coupled to said detector means for sampling the outputs thereof in a predetermined order; and display means including a cathode ray tube coupled to said switching means and to said readout means for developing an indication of the object to be mapped.

4. In a mapping system wherein provided are radar means for developing Doppler signals having frequency varying characteristics and time of occurrence characteristics representative of the position of objects within an area to be mapped and recording means coupled to said radar means for storing said Doppler signals, a multibeam synthetic array data processor for said mapping system comprising, in combination, reading means coupled to said recording means for scanning said stored doppler signals, control means coupled to said reading means for controlling said reading means to read said stored Doppler signals in a predetermined order to develop information signals; mixer means coupled to said recording means; swept oscillator means coupled between said reading means and said mixer means for developing a frequency varying reference signal, said mixer means developing a difference frequency signal; filter means including a plurality of narrowband filters coupled to said mixer means to pass predetermined spaced apart frequency bands of difference frequency; detector means coupled to each of said narrow-band filters for developing display signals in response to components of said difference frequency signal falling within said spaced apart frequency bands being passed through said filter means; output means including a cathode ray tube, means for deflecting the electron beam thereof in synchronism with said reading means and means for intensity modulating said electron beam; and commutating means coupled between said output means and said detector means for sequentially transmitting said display signals to said output means for developing an indication of the objects within said area to be mapped.

5. In a radar mapping system of the type operable from a moving craft to form a high resolution display of an area to be mapped and including radar means for developing Doppler signals from objects present within said area and recording means for storing said Doppler signals, multibeam synthetic array data processor comprising, in combination, readout means for scanning said stored Doppler signals to develop Doppler history signals; oscillator means for generating a reference signal of varying frequency; mixer means coupled to said readout means and to said oscillator means for mixing said Doppler history signals and said reference frequency signal to develop a difference frequency signal; filter means including a plurality of narrow-band filters arranged in parallel circuit relationship and coupled to said mixer means, each of said filters having predetermined spaced apart pass-bands; detector means coupled to each of said narrow-band filters for developing display signals in response to the transmission therethrough of those components of said difference frequency signal falling within said pass-bands; commutating means including an output terminal coupled to said detector means for providing a conductive path between same and said output terminal; and display means coupled to said output terminal and including a cathode ray tube, means for deflecting the electron beam thereof in synchronism with said readout means, and means for modulating said electron beam with said display signals to develop a two-dimensional indication of the objects within the area to be mapped.

6. In a radar mapping system of the type operable from a moving craft to form a high resolution display of an area to be mapped and including radar means for developing Doppler signals from objects present within said area and recording means for storing said Doppler signals, a multibeam synthetic array data processor comprising, in combination, readout means for scanning said stored Doppler signals to develop Doppler history signals; oscillator means for generating a reference signal of varying frequency, said oscillator means including means responsive to said readout means for varying the rate of change of said varying frequency as a function of the range being scanned by said readout means; mixer means coupled to said readout means and to said oscillator means for mixing said Doppler history signals and said reference frequency signal to develop a difference frequency signal; filter means including a plurality of narrow-band filters arranged in parallel circuit relationship and coupled to said mixer means, each of said filters having predetermined spaced apart pass-bands; detector means coupled to each of said narrow-band filters for developing display signals in response to the transmission therethrough of those components of said difference frequency signal falling within said pass-bands; commutating means including an output terminal coupled to said detector means for providing a conductive path between same and said output terminal; and display means coupled to said output terminal and including a cathode ray tube, means for deflecting the electron beam thereof in synchronism with said readout means, and means for modulating said electron beam with said display signals to develop a two-dimensional indication of the object within the area to be mapped.

7. A radar mapping system operable to map a range interval from a craft moving in azimuth relative to objects being mapped comprising, in combination, coherent radar means for developing Doppler signals representative of the position of objects within said range interval; recording means coupled to said radar means for storing said Doppler signals; readout means coupled to said recording means for scanning the stored Doppler signals to develop Doppler history signals; oscillator means for generating a reference signal of varying frequency; mixer means coupled to said readout means and to said oscillator means for developing a difference signal from said Doppler history signal and said reference signal; filter means including a plurality of narrow band-pass filters parallelly coupled to said mixer means, each of said filters being operative to pass predetermined spaced apart portion of the frequency spectrum of said difference signal; detector means coupled to each of said filters and adapted to provide mapping signals when corresponding portions of said difference signals pass through said filter means; commutator means coupled to said detector means and including means for sampling same as said readout means scans the stored Doppler signals; and output means coupled to said commutator means and including a cathode ray tube, means for deflecting the electron beam thereof in synchronism with said sampling means; and means for modulating said electron beam with said mapping signals to develop a high resolution map of said range interval.

8. In a radar mapping system of the type operable from a moving craft to form a high resolution display of an area to be mapped and including radar means for developing Doppler signals from objects present within said area and recording means for storing said Doppler signals synthetic array data processor comprising, in combination, readout means for scanning said stored Doppler signals to develop Doppler history signals, said readout means including a read cathode ray tube; means for deflecting the electron beam of said read cathode ray tube at a first rate in an azimuth direction and concomitantly at a second rate in the range dimension to form a reading frame; mixer means coupled to said readout means; variable gain means responsive to said deflecting means for developing a control signal comprising a ramp voltage the slope of which is different for each successive azimuth deflection of said read electron beam during each reading frame; oscillator means coupled to said mixer means and to said variable gain means for generating a reference signal of varying frequency in response to said ramp voltage, said mixer means developing a difference frequency signal representative of the azimuth position of said objects; filter means including a plurality of narrow-band filters arranged in parallel circuit relationship and coupled to said mixer means, each of said filters having predetermined spaced apart pass-bands; detector means coupled to each of said narrow-band filters for developing display signals in response to the transmission therethrough of those components of said difference frequency signal falling within said pass-bands; commutating means including an output terminal coupled to said detector means for providing a conductive path between same and said output terminal; and display means coupled to said output terminal and including a cathode ray tube, means for deflecting the electron beam thereof in synchronism with said readout means, and means for modulating said electron beam with said display signals to develop a two-dimensional indication of the objects within the area to be mapped.

9. A radar mapping system operable to map a range interval from a craft moving in azimuth relative to objects being mapped comprising, in combination, coherent radar means for developing Doppler signals representative of the position of objects within said range interval; recording means coupled to said radar means for storing said Doppler signals; readout means coupled to said recording means for scanning the stored Doppler signals to develop Doppler history signals; oscillator means for generating a reference signal of varying frequency, said oscillator means including means responsive to said readout means for varying the rate of change of said varying frequency as a function of the range being scanned by said readout means; mixer means coupled to said readout means and to said oscillator means for developing a difference signal from said Doppler history signal and said reference signal; filter means including a plurality of narrow band-pass filters parallelly coupled to said mixer means, each of said filters being operative to pass predetermined spaced apart portions of the frequency spectrum of said difference signal; detector means coupled to each of said filters and adapted to provide mapping singals when corresponding portions of said difference signals pass through said filter means; commutator means coupled to said detector means and including means for sampling same as said readout means scans the stored Doppler signals; and output means coupled to said commutator means and including a cathode ray tube, means for deflecting the electron beam thereof in synchronism with said sampling means; and means for modulating said electron beam with said mapping signals to develop a high resolution map of said range interval.

10. A focused mapping system operable to map a range interval from a craft moving in azimuth relative to objects being mapped comprising, in combination, coherent radar means for developing a plurality of frequency varying Doppler signals having frequency and time characteristics representative of the position of the moving craft; means for recording said Doppler signals received over said range interval in the form of parallel line traces along the range dimension, the information from each range forming separable range elements; reading means coupled to said recording means for sequentially scanning successive range elements to develop Doppler history signals; control means coupled to said reading means for developing a first sweep signal having a duration so said reading means scans a portion of said traces in a direction substantially orthogonal thereto to form a range element and for developing a second sweep signal so said reading means sequentially scans successive range element for developing informational signals having frequency components proportional to the recorded Doppler signals; mixing means coupled to said reading means; swept oscillator means coupled to said mixing means; variable gain means coupled to said swept oscillator means and to said control means, said variable gain means being responsive to said first and second sweep signals to continually develop a reference frequency function having a predetermined rate of change of frequency during each of said first sweep signals to conform to the rate of change of frequency of said informational signals to provide focusing, said mixing means developing a difference frequency representative of the azimuth position of said objects; filter means including a plurality of narrow-band filters coupled to said mixing means for passing predetermined spaced apart frequency bands of said difference frequencies; detector means coupled to each of said narrow-band filters for developing display signals in response to components of said difference frequency falling within said spaced apart frequency bands being passed through said filter means; output means including a cathode ray tube, means for deflecting the electron beam thereof in synchronism with said reading means, and means for intensity modulating said electron beam; and switching means coupled between said output means and said detector means for commutating display signals to the intensity modulating means of said output means to develop a two-dimensional indication of the objects within said area being mapped.

11. A system for sequentially processing stored Doppler information signals having a frequency variation indicative of the position of objects in a first dimension and a time of occurrence indicative of the position of objects in a second dimension, said Doppler information being stored on a storage means in said first and second dimensions comprising reading means coupled to said storage means; means coupled to said reading means for controlling said reading means to read a portion of said stored Doppler information in said first dimension sequentially over a predetermined number of elements in said second dimension to develop in sequence a plurality of signals at frequencies representative of the stored Doppler information of each of said elements; mixing means coupled to said reading means; oscillator means coupled to said mixing means and to said controlling means for developing a repeditive reference signal of varying frequencies in synchronism with the reading of said stored information in said first dimension, said mixing means developing signals having a frequency equal to the frequency difference between said signals developed by said reading means and said reference signal; filter means coupled to said mixing means and including a plurality of narrow-band pass filters each having a pass-band centered at predetermined spaced apart frequencies; detecting means coupled to each of said narrow-band pass filters for developing an envelope signal from the signals being passed therethrough; output means including a cathode ray tube, means for deflecting the electron beam thereof in synchronism with said reading means and means for intensity modulating said electron beam; and switch means coupled intermediate said detecting means and said output means for connecting said envelope signals in sequence to said intensity modulating means to develop a two-dimensional indication of said information signals.

12. A focused mapping system operable to map a range interval from a craft moving in azimuth relative to objects being mapped comprising, in combination, coherent radar means for developing a plurality of frequency varying Doppler signals having frequency and time characteristics representative of the position of the moving craft; means for recording said Doppler signals received over said range interval in the form of parallel line traces along the range dimension, the information from each range forming separable range elements; reading means coupled to said recording means for sequentially scanning successive range elements to develop Doppler history signals; control means coupled to said reading means for developing a first sweep signal having a duration so said reading means scans a portion of said traces in a direction substantially orthogonal thereto to form a range element and for developing a second sweep signal so said reading means sequentially scans successive range element for developing informational signals having frequency components proportional to the recorded Doppler signals; mixing means coupled to said reading means; swept oscillator means coupled to said mixing means; variable gain means coupled to said swept oscillator means and to said control means, said variable gain means being responsive to said first and second sweep signals to develop a reference frequency function having a predetermined rate of change of frequency during each of said first sweep signals, said predetermined rate during any one of said first sweep signals being different from the preceding and succeeding sweep signals to provide all range focusing, said mixing means developing a difference frequency representative of the azimuth position of said objects; filter means including a plurality of narrow-band filters coupled to said mixing means for passing predetermined spaced apart frequency bands of said difference frequencies; detector means coupled to each of said narrow-band filters for developing display signals in response to components of said difference frequency falling within said spaced apart frequency bands being passed through said filter means; output means including a cathode ray tube, means for deflecting the electron beam thereof in synchronism with said reading means, and means for intensity modulating said electron beam; and switching means coupled between said output means and said detector means for commutating display signals to the intensity modulating means of said output means to develop a two-dimensional indication of the objects within said area being mapped.

13. A synthetic array radar system for providing focused mapping of objects in a range interval opposite a moving craft in response to Doppler signals stored in successive range traces across a movable strip film in the form of film density variations, the frequency and time occurrence characteristics of which represent the range and azimuth positions of objects located within said range interval, comprising a read scanning cathode ray tube disposed adjacent to said strip film for developing a movable light spot with the electron beam thereof; means including first and second sweep generators for deflecting said electron beam in the azimuth and range dimensions at first and second sweep rates, respectively, said second sweep rate being substantially slower than said first sweep rate; means for imaging said light spot onto said strip film, said light spot being swept continuously across successive range elements in response to said first sweep generator, each of said range elements defining a synthetic array length comprising a predetermined number of said range traces, said light spot also being swept across successive reading frames in response to said second sweep, each of said reading frames comprising a predetermined number of said range elements; photosensing means disposed adjacent to said strip film for developing Doppler history signals during each range element having frequencies proportional to the stored Doppler signals; a mixer coupled to said photosensing means; a swept oscillator coupled to said mixer; variable gain means coupled between said deflecting means and said swept oscillator and responsive to said first and second generators to control said swept oscillator to develop a reference frequency signal that varies over a predetermined frequency range for each range element at a rate substantially the same as that of said Doppler history signals, said mixer developing a difference signal between said Doppler history signals and said reference frequency signal; a plurality of narrow-band filters parallelly coupled to said mixer, each of said filters having a pass-band centered at predetermined spaced apart frequencies; an envelope detector coupled to each of said filters for developing display signals in response to the appropriate component of said difference signal being passed through the respective filter; display means including a cathode ray tube, means for deflecting the electron beam thereof at said first sweep rate, and means for intensity modulating said last-mentioned electron beam; and commutating means coupled between said display means and each of said detectors for sampling the outputs thereof during the time said read electron beam scans the following range element for developing a two-dimension indication of the objects being mapped.

* * * * *